United States Patent Office 2,710,302
Patented June 7, 1955

2,710,302

PREPARATION OF CYANO COMPOUNDS

Archibald M. Hyson, Wilmington, Del., assignor to E. I. du Pont de Nemours and Company, Wilmington, Del., a corporation of Delaware No Drawing. Application April 6, 1954, Serial No. 421,436

7 Claims. (Cl. 260—464)

This invention relates to a process for preparing cyano-substituted organic compounds, based on a reaction of hydrogen cyanide with a cycloalkyl hydroperoxide.

It has been discovered, in accordance with this invention, that organic hydroperoxides of the formula ROOH, wherein R is a member of the class consisting of 1-hydroxycycloalkyl and 1-alkylcycloalkyl, said cycloalkyl group containing from 5 to 6 carbon atoms in the ring, inclusive, are capable of reacting with hydrogen cyanide to form compounds which contain a terminal cyano group. For example, in the case of hydroxycyclohexyl hydroperoxide as the hydroperoxide reactant, the reaction using a simplified formula for this hydroperoxide can be formulated as follows:

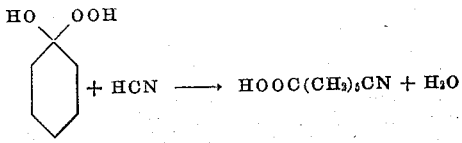

This ring opening is preferably effected in the presence of a copper compound, suitably cuprous chloride or cuprous cyanide. When the grouping attached to the hydroperoxy group is 1-hydroxycycloalkyl, the reaction product obtained by reaction with HCN is a cyanoalkanoic acid. When the grouping attached to the hydroperoxy group is 1-alkylcycloalkyl, the reaction product obtained by reaction with HCN is a cyanoalkyl alkyl ketone.

The reactions just described probably occur by way of a free-radical mechanism, involving formation of transitory structures such as

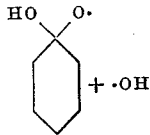

On the other hand the reaction may involve formation of ions, as follows:

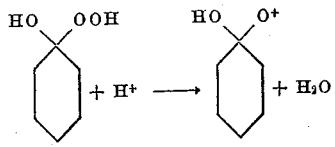

Ring opening, followed by addition of HCN, would account for the result in either instance. In addition to these probable mechanisms, it is also possible that lactone formation can play a part. Thus, it has actually been observed that hydroxycyclohexyl hydroperoxide, in the presence of acid, is converted to caprolactone

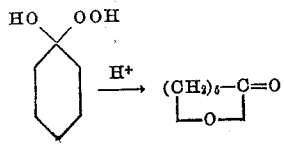

It is of interest also that cyano acids have been produced by reaction of certain lactones, with potassium cyanide (German Patent No. 707,853, issued in 1941 to I. G. Farben.; cf. also Blaise, Bull. Soc. Chem., 29, 335 (1903), and Blanc, Bull. Soc. Chim., 33, 886 (1905)). In repeating the latter process with caprolactone, it has now been found that there is considerable interference due to the formation of polyester, via the reaction

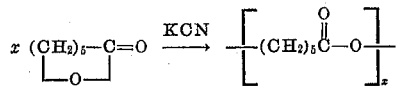

Such polyesters are generally not formed, however, when the hydroperoxide reacts directly with HCN.

The conditions for carrying out the reaction of hydrogen cyanide with the hydroperoxide may be varied rather widely. In general an initial temperature of about 0° to 50° C. is employed. Any suitable polar reaction medium, such as water, methanol, etc., may be used. The final heating temperature may be determined in part by the nature of the reaction medium, but generally speaking steam bath temperatures are sufficient in the final heating stage. There is no need for using pressures in excess of atmospheric, but this can be done if desired. An operable range of temperature is about 0° to 150° C. The details of a suitable procedure for carrying out the process of the invention is given below.

*Example 1.*—To a round-bottom, 3-necked flask, having a capacity of 500 ml. and fitted with a mechanical stirrer and reflux condenser, was added 5 grams of cuprous cyanide, 200 ml. of hydrogen cyanide, and 50 ml. of water. To this mixture was added portionwise with stirring at a temperature of 26° to 30° C., 40 grams of 1-hydroxycyclohexyl hydroperoxide. The reaction started slowly but became quite rapid and exothermic after about one quarter of the hydroperoxide had been added. Most of the cuprous cyanide catalyst went into solution during the addition of the hydroperoxide. After the addition of the hydroperoxide was completed, stirring was continued for an additional 20 minutes after which nearly all of the excess of hydrogen cyanide was removed by heating the reaction mixture on a steam bath. The resulting mixture was cooled and to it was added about an equal volume (250 ml.) of diethyl ether. The mixture was filtered to remove insoluble salts and the layers in the filtrate were separated. After repeated extraction of the aqueous layer with ether the combined ether extracts were washed with water and then washed with aqueous sodium bicarbonate solution. Evaporation of ether from the resulting ether solution gave 22 grams of yellow oil. The aqueous sodium bicarbonate solution was acidified with hydrochloric acid and extracted several times with ether. The ether extract thus obtained gave 20 grams of orange-colored acidic oil on evaporation of ether therefrom. Distillation of the acidic oil gave a fraction having a boiling point of 135° to 140° C. at 0.5 mm. This material had a nitrogen content of 9.26, 10.04% and a neutralization equivalent of 140.0, 140.9. The theoretical values for 6-cyanohexanoic acid are 9.93 and 141.0 respectively. The infra red spectrum of this material was consistent with the 6-cyanohexanoic acid structure. An approximately equal quantity of pimelic acid was also obtained from the distillate by recrystallization from benzene-petroleum ether mixture. The yellow oil obtained by evaporation of ether extraction of the neutral solution was found to be made up largely of or entirely of cyclohexanone cyanhydrin.

*Example 2.*—Into a reaction vessel of the kind employed in Example 1 was placed a mixture of 55 ml. hydrogen cyanide, 100 ml. of methanol and 5 grams cuprous cyanide. To this mixture with stirring was added 30 grams of 1-hydroxycyclohexyl hydroperoxide. The reaction conditions were the same as described in Example 1 and isolation of the acidic and neutral fractions were carried out in the manner described in Example 1. The neutral fraction weighed 12.8 grams and the acidic fraction weighed 14.4 grams. Distillation of the acidic fraction gave 10 grams of distillate most of which boiled at 156° C. at a pressure of 2 mm. Infrared analysis indicated that this material contained only about 10% of 6-cyanohexanoic. The chief product in this reaction was a methyl half ester of pimelic acid. This was indicated by the fact that basic hydrolysis of a sample of the mixture (weight of sample equals 2 grams) gave 1.8 grams of pimelic acid. From the neutral fraction a crystalline product separated. Upon recrystallization from methanol this material had a melting point of from 125 to 133° C. Analysis for carbon, hydrogen, nitrogen indicates that this material was bis-(1-cyanocyclohexyl) amine. The main neutral product of the reaction was cyclohexanone cyanhydrin.

*Example 3.*—Example 1 was repeated with a 1-methylcyclohexyl hydroperoxide in place of 1-hydroxycyclohexyl hydroperoxide. The neutral reaction product contained nitrile and carbonyl groups which indicated that the reaction had proceeded to form a ketone of the formula

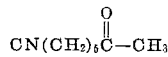

*Example 4.*—In a 1-liter, round-bottom, three-neck flask fitted with a reflux condenser, stirrer, dropping funnel and thermometer-well, was placed 85 ml. of hydrogen cyanide, 85 ml. of water and 5 grams of cuprous cyanide. To this stirred mixture at room temperature was added 8 ml. of 20–25% hydrogen peroxide to activate the catalyst. After the hydrogen peroxide reaction had subsided, 230 grams of oxidized methyl cyclopentane solution (8% methylcyclopentyl hydroperoxide) was added over a period of 20 minutes while the temperature was maintained at 28–33° C. by occasional cooling. This was followed by 300 grams of additional oxidized methyl cyclopentane solution containing 5.48% methylcyclopentyl hydroperoxide. The total peroxide added, calculated as methylcyclopentyl hydroperoxide was 38.4 grams. The reaction mixture was stirred for 30 minutes, after which the reaction product was isolated and distilled through a 10-inch Vigraeux column. The fraction boiling at 92–110° C./4 mm. was collected. Weight=10.6 grams. A portion of this distillate was redistilled through a micro spinning band column as follows: (1) 60–71° C./2mm.—2.0 ml.; (2) 73–65° C./1 mm.—1.9 ml.; (3) 76–91° C./1–2 mm.—0.9 ml. The center cut was identified as 6-keto heptonitrile.

It is to be understood that the foregoing examples are illustrative only and that numerous embodiments of the invention will appear to those who are skilled in the art. For example, various reaction media including mixtures of alcohol and water may be employed if desired. A wide variety of methods for working up the reaction products can be employed and of course suitable procedures can be used for recovering and recycling the unreacted hydrogen cyanide.

The products obtained in accordance with the process of this invention are difunctional compounds which can be used as intermediates in the manufacture of polymeric materials. For example 6-cyanohexanoic acid can be reduced to 7-aminoheptanoic acid by reaction with hydrogen in the presence of a cobalt catalyst. The latter material is suitable for use as a component of polyamide resins.

I claim:

1. A process for the preparation of cyano-substituted organic compounds which comprises interacting hydrogen cyanide with an organic hydroperoxide of the formula ROOH wherein R is a member of the class consisting of 1-hydroxycycloalkyl and 1-alkyl cycloalkyl, said cycloalkyl group containing from 5 to 6 carbon atoms in the ring, whereby a cyano-substituted organic compound is produced, and thereafter separating the said compound from the resulting mixture.

2. Process of claim 1 carried out in the liquid phase at a temperature within the range of 0° to 150° C.

3. Process of claim 1 wherein the reaction is carried out at a temperature within the range of 0° to 150° C. in the presence of a cuprous compound as catalyst.

4. Process of claim 3 wherein the reaction is carried out in the presence of water as the reaction medium.

5. Process of claim 3 wherein the reaction is carried out in the presence of methanol as a reaction medium.

6. Process of claim 5 wherein the hydroperoxide reactant is 1-hydroxy cyclohexyl hydroperoxide.

7. Process of claim 5 wherein the hydroperoxide reactant is 1-methylcyclopentylhydroperoxide.

No references cited.